United States Patent
Kauf et al.

(10) Patent No.: US 8,074,454 B2
(45) Date of Patent: Dec. 13, 2011

(54) COMBINATION POWER PLANT AND METHOD FOR THE COOLING THEREOF

(75) Inventors: Michael Kauf, Igensdorf (DE); Bernd Lüneburg, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 970 days.

(21) Appl. No.: 11/587,875

(22) PCT Filed: Apr. 27, 2005

(86) PCT No.: PCT/EP2005/051890
§ 371 (c)(1),
(2), (4) Date: Jan. 28, 2008

(87) PCT Pub. No.: WO2005/106214
PCT Pub. Date: Nov. 10, 2005

(65) Prior Publication Data
US 2008/0190094 A1    Aug. 14, 2008

(30) Foreign Application Priority Data
Apr. 30, 2004    (EP) .................................... 04010374

(51) Int. Cl.
*F02C 6/04*    (2006.01)
(52) U.S. Cl. ..................... 60/773; 60/39.182; 60/39.163
(58) Field of Classification Search .................... 60/773, 60/39.182, 39.163
See application file for complete search history.

(56) References Cited

U.S. PATENT DOCUMENTS

| | | | | |
|---|---|---|---|---|
| 3,597,653 A | * | 8/1971 | Moore et al. ................... | 361/240 |
| 3,965,675 A | * | 6/1976 | Martz et al. ................. | 60/39.182 |
| 4,430,575 A | * | 2/1984 | Quigg ............................ | 60/709 |
| 5,433,079 A | * | 7/1995 | Badami et al. ................. | 60/660 |
| 2003/0014962 A1 | * | 1/2003 | Tanaka et al. .............. | 60/39.182 |
| 2004/0159105 A1 | * | 8/2004 | Tanaka et al. .............. | 60/39.182 |
| 2005/0022497 A1 | * | 2/2005 | Takai et al. ................ | 60/39.182 |

FOREIGN PATENT DOCUMENTS

| | | |
|---|---|---|
| CN | 1464947 A2 | 12/2003 |
| DE | 926 133 | 8/1954 |
| DE | 44 26 354 A1 | 2/1996 |
| EP | 0 961 011 A1 | 12/1999 |
| EP | 1 400 718 A1 | 3/2004 |

OTHER PUBLICATIONS

DE 4426354 machine translation (EPO machine translation) done on Aug. 9, 2011.*

* cited by examiner

*Primary Examiner* — Ted Kim

(57) ABSTRACT

The invention relates to a combination power plant which is embodied as a single shaft, power plant, essentially consisting of a gas turbine, a steam turbine and a generator which is connected therebetween. A coupling is arranged between the generator and the steam turbine, and at least one drive device, which is used to drive the single-shaft power plant, is also provided. The coupling is uncoupled during a turning operation and a control unit, which is used to control the rotational speed of the steam turbine, is provided.

8 Claims, 2 Drawing Sheets

COMBINATION POWER PLANT AND METHOD FOR THE COOLING THEREOF

CROSS REFERENCE TO RELATED APPLICATIONS

This application is the US National Stage of International Application No. PCT/EP2005/051890, filed Apr. 27, 2005 and claims the benefits of European Patent application No. 04010374.9 filed Apr. 30, 2004. All of the applications are incorporated by reference herein in their entirety.

FIELD OF INVENTION

The invention relates to a combination power plant which is embodied as a single shaft power plant essentially consisting of a gas turbine, a steam turbine and a generator which is connected therebetween, a coupling being arranged between the generator and the steam turbine, and at least one drive device being provided for the purpose of driving the single shaft power plant. The invention also relates to a method for cooling a combination power plant embodied as a single shaft power plant, after having been brought up to operating temperature.

BACKGROUND OF THE INVENTION

Combination power plants embodied as a single shaft power plant are described in the report "Single shaft combined cycle power generation systems", 9$^{th}$. Conference of Electric Power Supply Industry, Hong Kong 1992, and are previously disclosed accordingly. A generator is driven in this case by a gas turbine and a steam turbine. A coupling arranged between the steam turbine and the gas turbine is embodied in this case as a synchronized and self-actuating coupling. The gas turbine can accordingly be operated on its own. The cooling periods for the rotating principal components of the gas turbine, and also those of the steam turbine, must be allowed to elapse before being able to make a start on inspection or repair work after shutting down the combination power plant. The gas turbine rotor and the steam turbine rotor must be caused to rotate by means of a shaft-rotating device during this cooling period, in order to prevent deformation as a consequence of thermal stresses. As a rule, the gas turbine will already have cooled down to a temperature at which the inspection work can be carried out after a single day, whereas the steam turbine, on the other hand, will require a cooling period of up to a week.

A combination power plant embodied as a single shaft power plant is illustrated in DE 44 26 354 C2. A coupling arranged between the gas turbine and the steam turbine is embodied in this case in such a way that it is uncoupled in the rest condition and engages automatically only upon reaching a specific boundary speed. The combination power plant described in DE 44 26 354 C2 is embodied with two shaft-rotating devices acting as drive devices. One shaft-rotating device is provided for the purpose of causing the steam turbine rotor to rotate, whereas the second shaft-rotating device is provided for the purpose of causing the gas turbine rotor to rotate.

If the rotational speed of the steam turbine is less than the rotational speed of the gas turbine, it is possible, by using the two shaft-rotating devices, to cause both the steam turbine rotor and the gas turbine rotor to rotate independently of one another during the cooling process.

Combination power plants with only a single, common drive device are also previously disclosed. In this particular embodiment, the gas turbine is caused to rotate together with the steam turbine via the drive device for the steam turbine. The turning speeds are identical in this case. The coupling between the gas turbine assembly and the steam turbine assembly is engaged.

The axial gap of such a coupling is only a few millimeters. During the cooling process, the so-called turning operation, it is necessary to cause the steam turbine rotor to rotate in order to prevent thermally induced deformation by so doing. Inspection work on the rotor or on parts of the gas turbine situated in the vicinity of the rotor in the case of a steam turbine that is involved in turning operation are prohibited for safety reasons. In the event of a fault-related incident, the coupling could be actuated unexpectedly. As a result, a major potential risk is presented by the considerable mass inertia of the steam turbine rotor and the relatively high rotational speed during turning operation, that is to say by the high stored rotational energy, if the coupling is actuated unexpectedly in a fault-related incident.

SUMMARY OF INVENTION

The object of the invention is to make an inspection concept available in a combination power plant of the kind mentioned by way of introduction and a method by means of which, after shutting down the plant, access can be gained at an earlier stage to the gas turbine assembly comprising a gas turbine, a generator, a slip-ring shaft and an excitation device.

The object with regard to the inspection concept is achieved by the features of the claims.

The object with regard to the method is achieved by the features of the claims.

The advantage of the invention is essentially that the rotational speed of the steam turbine rotor can be controlled down to such a low value that engagement of the coupling during a fault-related incident produces no effects on the shaft assembly as a whole, consisting of the gas turbine, generator and steam turbine.

The risk of employees being exposed to danger while performing inspection work on the gas turbine is all but eliminated in this way.

A further advantage is that the use of blocking devices, which have previously been utilized as an active means of protection, is no longer necessary.

A further advantage is that the coupling of existing combination power plants does not necessarily require to be redesigned. The invention is based on the assumption that the control unit is executed in such a way that the turning operation is conducted at extremely low rotational speeds. In this case, the steam turbine shaft is caused to rotate at a small number of revolutions per hour. The low rotational speed values are selected in such a way that, even in the event of the unintentional actuation of the coupling, which as a rule leads to the exertion of torque loadings by the steam turbine on the remaining parts in the shaft assembly, the resulting acceleration forces are not sufficient to cause the gas turbine to represent a potential risk. Starting-up of the gas turbine is all but prevented in this way.

The control unit is advantageously executed with a set value input for entering a nominal rotational speed.

It is possible by this means to specify a set value from the outside. Various rotational speeds can be selected depending on the embodiment of the steam turbine and the gas turbine.

The drive device is appropriately executed as an electrically driven motor or as an oil-powered motor. It is possible by this means, depending on the requirements and the equipment available on-site, to utilize a drive device that is suitable for the intended purpose.

In a further advantageous arrangement, the control unit is executed in such a way that the rotational speed is capable of being controlled in both directions of rotation during the turning operation.

The duration of the cooling process can be further reduced by this measure.

BRIEF DESCRIPTION OF THE DRAWINGS

Illustrative embodiments of the invention are represented with reference to the figures. Components with similar functions are designated in the figures with the same reference symbols.

DETAILED DESCRIPTION OF INVENTION

Figure 1:
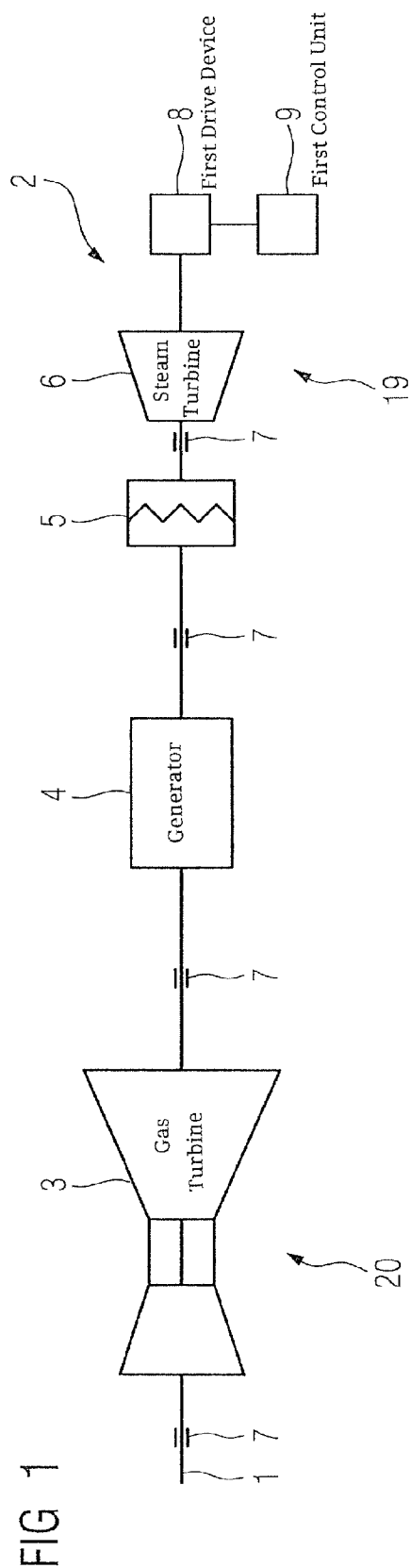
FIG. 1 is a schematic representation of a combination power plant.

As illustrated in FIG. 1, the shaft assembly as a whole for the single shaft power plant is designated generally with 1. The combination power plant 2 executed as a single shaft power plant exhibits a gas turbine 3, a generator 4, a coupling 5 and a steam turbine 6. The shaft assembly 1 is supported in bearings 7, although these are not depicted in detail here. A drive device 8 is connected to the shaft assembly 1 in such a way that a torque is exerted by the drive device 8 on the shaft arrangement 1 as a whole.

The drive device 8 can be executed as a turn motor.

The drive device 8 can be executed as an oil-powered motor or as an electric motor driven by a current.

In regular operation, the coupling 5 is actuated automatically. This causes a torque from the steam turbine rotor to be applied via the coupling 5 to the generator 4 and the gas turbine 3.

In order to avoid thermally induced distortion of the steam turbine 6 and the gas turbine 3, the steam turbine rotor and the gas turbine rotor must be caused to rotate by means of the drive device 8 during a cooling period. The coupling 5 can remain engaged at the start of the cooling process, that is to say a torque is transmitted via the coupling 5. The rotational speeds of the shaft assembly 1 in this case can lie between 3 and 200 revolutions per minute. The rotational speed can also lie between 3 and 50 revolutions per minute. If conditions are achieved for the gas turbine 3, at which work can be carried out for inspection purposes or repair purposes, the coupling 5 is opened, that is to say no torque is transmitted via the coupling 5. The drive device 8 now drives only the steam turbine rotor.

The rotational speed of the drive device 8 is controlled with a control unit 9. In this case, the steam turbine rotor is caused to rotate at such a low speed of rotation that undesired actuation of the coupling 5 does not result in rotation of the gas turbine rotor. The rotational speeds of the steam turbine rotor then lie between 1 and 240 revolutions per hour.

The rotational speeds of the steam turbine rotor can also lie between 1 and 50 revolutions per hour.

The speed of rotation in this case is below the speed during regular operation. The coupling can be executed as a previously disclosed toothed coupling. The task of the coupling 5 is to connect the steam turbine assembly 19 and the gas turbine assembly 20 to one another and, if necessary, to disconnect them.

The turning operation is necessary in order to prevent thermally induced deformation of the steam turbine rotor or the gas turbine rotor.

Figure 3:
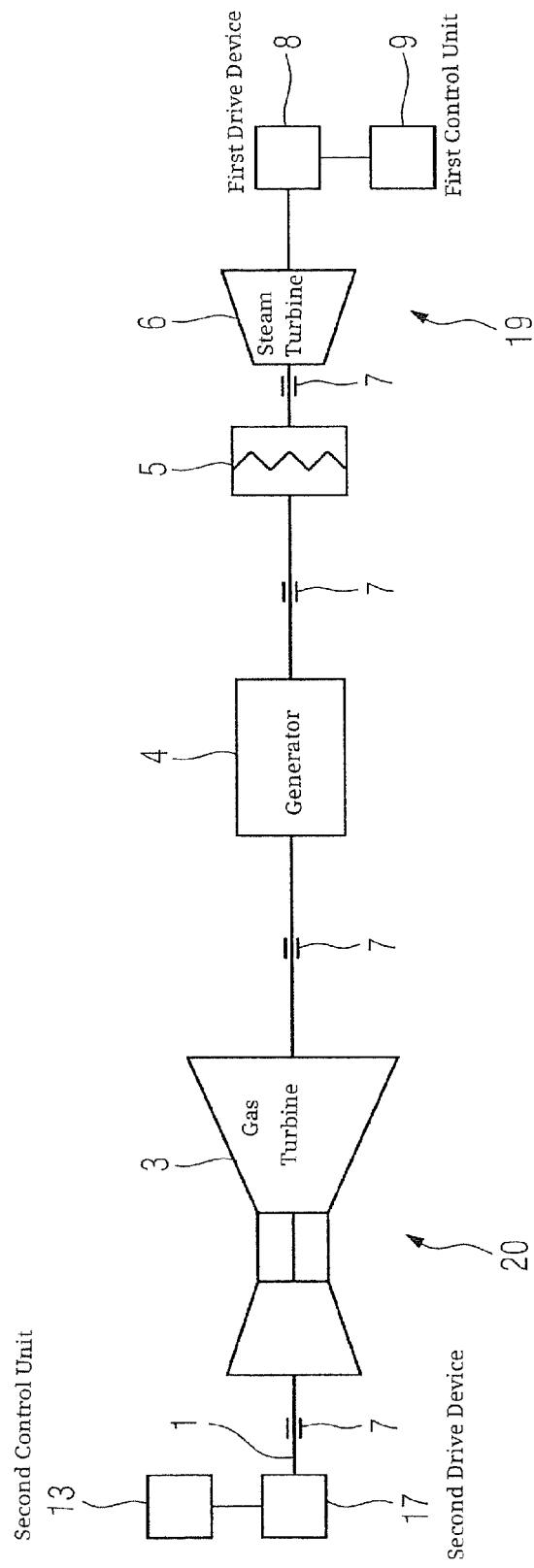
FIG. 3 is an alternative schematic representation of a combination power plant.

An alternative, schematic representation of a combined power plant is depicted in FIG. 3. The difference from FIG. 1 is that a second drive device 17 is now used to drive the gas turbine 3.

It is possible in this way to operate the gas turbine assembly 20 independently of the steam turbine assembly 19, including at a different rotational speed during the turning operation. For example, the gas turbine 3 can be operated at rotational speeds between 120 and 200 revolutions per minute, and the steam turbine 6 at between 50 and 60 revolutions per minute. The coupling 5 remains uncoupled in conjunction with this, of course.

The second drive device 17 is connected to a second control unit 13.

Figure 2:
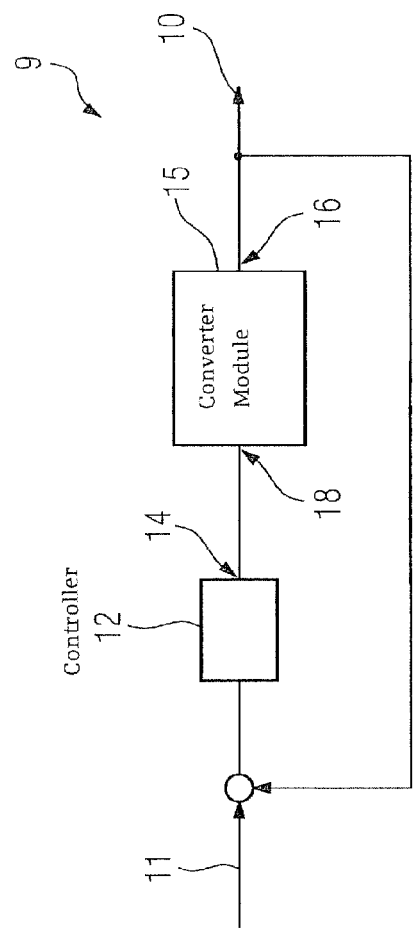
FIG. 2 is an embodiment of a control unit.

A control unit 9 is depicted in FIG. 2. The control unit 9 exhibits a controller output 10, which is connected to an input for the drive device 8. The control unit 9 exhibits a controller input 11, to which an adjustable set value input signal is applied. Either the rotational speed of the shaft assembly 1 or the rotational speed and/or the torque are used as the set value. The core controller module 12 is executed as a PI controller or as a PID controller. In alternative embodiments, the core controller module 12 can also be executed as a P controller.

A controller output value is applied as a controller output signal to a controller output 14, which is connected to an input 18 into a converter module 15.

The control unit 9 is executed in such a way that set values are capable of being specified via the controller input 11 which at an output 16 leads to a rotational speed as a controlled initial value, with which it is possible to maintain the rotational speed at a constant low value during the turning operation.

The rotational speed in this case is selected in such a way that unintentional actuation of the coupling 5 during the turning operation does not produce an effect on the shaft assembly.

In an alternative embodiment, the control unit 9 can be fully integrated into the turbine control system. An operating error caused externally by third parties is all but prevented by the possibility of fully automatic operation.

The invention claimed is:

1. A single-shaft combination power plant having a shaft axis, comprising:

a shaft assembly arranged coaxially with the shaft axis and comprising a gas turbine section, a steam turbine section and a generator section;

a gas turbine arranged coaxially with the shaft axis and including the gas turbine section of the shaft assembly;

a steam turbine arranged coaxially with the shaft axis and including the steam turbine section of the shaft assembly;

a generator arranged coaxially with the shaft axis and including the generator section of the shaft assembly and connected to the steam and gas turbine sections of the shaft assembly;

a coupling arranged between the generator and the steam turbine sections of the shaft assembly;

a drive device connected to the shaft assembly that drives the single shaft power plant; and a control unit connected to the drive device that controls a rotational speed of the steam turbine, wherein the control unit is configured to control the rotational speed of the steam turbine such that the steam turbine rotates at such a low rotational speed below 240 revolutions per hour that an undesired actuation of the coupling does not result in a rotation a rotor of the gas turbine.

2. The combination power plant as claimed in claim 1, wherein the control unit exhibits a set value input for entering a nominal speed of the drive device.

3. The combination power plant as claimed in claim 1, wherein the drive device is an electrical or hydraulic motor.

4. The combination power plant as claimed in claim 3, wherein the control unit controls a rotational speed of the power plant in both directions.

5. A method for cooling a single shaft combination power plant having a gas turbine, a steam turbine, and a generator connected between the turbines, and a coupling arranged between the generator and the steam turbine where the turbines and generator are at operating temperature, comprising:
  providing a drive device for driving the single shaft power plant;
  operating the gas turbine and the steam turbine at a same speed with rotational speeds between 1 and 200 revolutions per minute during a turning operation;
  uncoupling the coupling once the gas turbine is cooled so that no torque is transmitted via the coupling to the gas turbine;
  operating the steam turbine at rotational speeds between 1 and 240 revolutions per hour while the gas turbine is not driven by the drive device; and
  controlling the rotational speed of the steam turbine with a control unit,
  wherein the control unit is configured to control the rotational speed of the steam turbine such that the steam turbine rotates at such a low rotational speed below 240 revolutions per hour that an undesired actuation of the coupling does not result in a rotation of a rotor of the gas turbine.

6. The method as claimed in claim 5, wherein the steam turbine is operated at rotational speeds between 1 and 50 revolutions per hour.

7. The method as claimed in claim 5, wherein the drive device is an electrical or hydraulic motor.

8. The method as claimed in claim 5, wherein the control unit controls the rotational speed of the power plant in both directions.

* * * * *